W. S. SHERMAN.
END MATCHER.
APPLICATION FILED AUG. 18, 1911.

1,102,694.

Patented July 7, 1914.
5 SHEETS—SHEET 1.

Fig. 1.

WITNESSES.

INVENTOR.
Willis S. Sherman,
By Morsell & Caldwell
ATTORNEYS.

UNITED STATES PATENT OFFICE.

WILLIS S. SHERMAN, OF MILWAUKEE, WISCONSIN.

END-MATCHER.

1,102,694.

Specification of Letters Patent.

Patented July 7, 1914.

Application filed August 18, 1911. Serial No. 644,834.

*To all whom it may concern:*

Be it known that I, WILLIS S. SHERMAN, a citizen of the United States, residing in Milwaukee, in the county of Milwaukee and State of Wisconsin, have invented new and useful Improvements in End-Matchers, of which the following is a description, reference being had to the accompanying drawings, which are a part of this specification.

This invention has for its object to provide an end matcher of the continuous operating type with which strips of flooring or the like may be fed to cutters by simply inserting their ends in the machine when they will be automatically moved between guides to the cutters to have tongues or grooves cut in them and will then enter a clamping carrier which carries them to one side and discharges them onto a conveyer traveling away from the machine.

An object of the invention is to provide novel means for engaging and moving the work through the guides to the cutters which will be dependent in its operation upon the proper positioning of the work.

Another object of the invention is to provide locking mechanism which will prevent the work being moved into its operative position when the work moving means is not in proper position therefor.

Another object of this invention is to provide a work carrier of novel construction for receiving and clamping the work as it issues from the guides and carrying it away from the guides and cutters before releasing it.

Another object of the invention is to provide a means for ejecting the work if it is too thin to properly fit between the guides and thus prevent the cutters being wedged apart by their drawing the work between them unrestrained.

Another object of this invention is to perfect details of construction of an end matcher of this type.

With the above and other objects in view the invention consists in the end matcher herein claimed, its parts and combinations of parts and all equivalents.

Referring to the accompanying drawings in which like characters of reference indicate the same parts in the different views: Fig. 5 is a detail view of the clamping jaws of the work carrier; Fig. 6 is a detail view showing the release of the locking means for the work support by the travel of the work away therefrom; Fig. 7 is a sectional plan view of the means for swinging the work pushing fingers into operative engagement with the work in the position shown in Fig. 6; Fig. 8 is a view similar to Fig. 6 showing the work pushing fingers out of position for engaging the work; Fig. 9 is a view similar to Fig. 7 showing the swinging means for the work pushing fingers in the position in which they are shown in Fig. 8; Fig. 10 is a side view of the end of the frame showing the sliding bearing for the work carrier; Fig. 11 is a detail view showing the adjustable connection for the tripping arm for actuating the work engaging fingers of the work pusher; and, Fig. 12 is a detail view of the work support showing an adjustably connected work stop.

Figure 3:
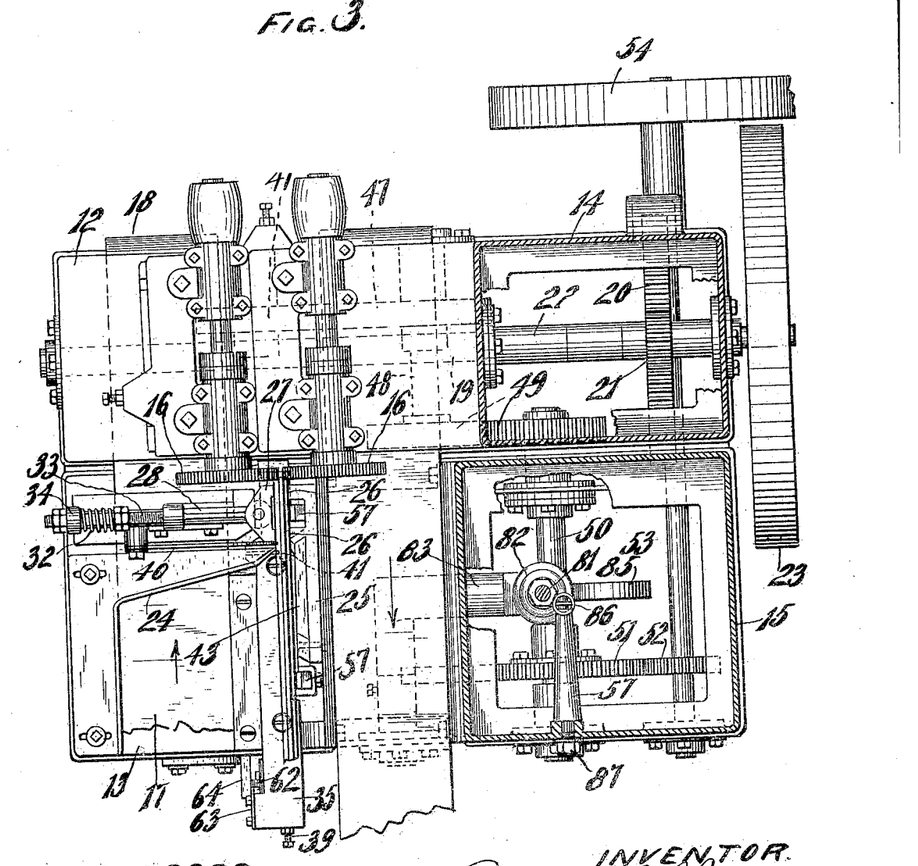
Fig. 3 is a plan view of the machine with parts broken away to show the gearing connections.
Figure 4:
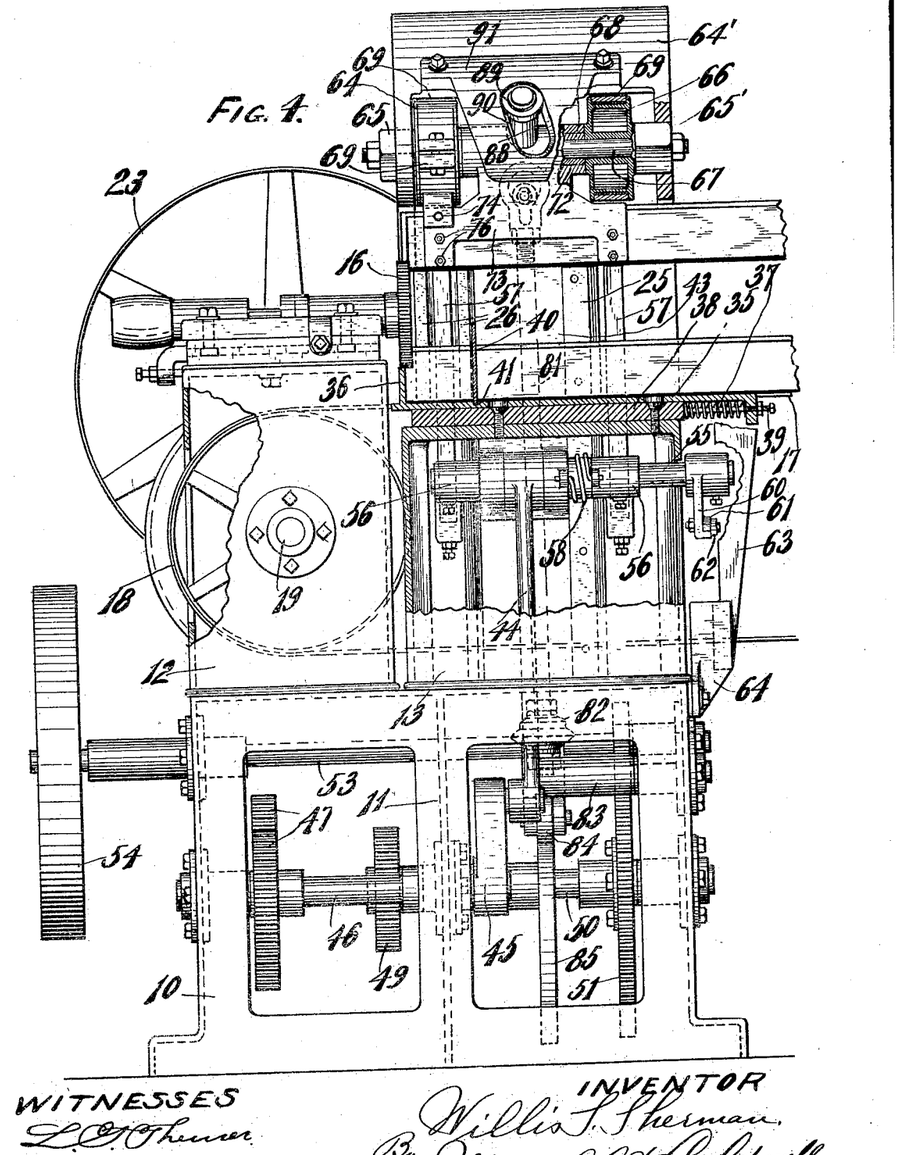
Fig. 4 is a sectional side elevation of the machine showing one strip of work in position to be carried up between the guides and another strip of work being discharged by the work carrier.

In these drawings 10 indicates a base frame which is divided into two portions by a partition 11 and serves to support an upper frame which is made up of several independent portions 12, 13, 14 and 15 mounted thereon. One portion of the frame, 12, constitutes a support on which is adjustably mounted one or more cutters 16 for cutting the tongue or groove in the ends of strips of flooring or the like and the adjacent section 13, of the frame forms a support for the work. Over this section of the frame travels an incoming conveyer belt 17 for bringing strips of flooring or the like to the machine, said belt passing around a pulley 18 on a shaft 19 which is journaled through the two rear sections 12 and 14 of the frame and carries a large gear 20 meshing with a small gear 21 on another shaft 22 which is driven by a belt pulley 23 from any suitable source of power. As best seen in Fig. 3, the frame section 13 is provided with an adjustable stop 24 extending across the conveyer belt 17 to engage the ends of strips of flooring or the like thereon and detain them until the operator places them in position on the work support. The stop 24 crosses the conveyer belt obliquely so as to form a flaring throatway between it and a stationary guide 25, the latter also standing up from frame section 13, and work is turned on its edge and forced through this throat way to its operative position beneath the cutters 16. In this position it stands between a stationary guide face 26 on the guide 25 and a pivoted work guide 27 on a presser guide head 28 which is slidably mounted on a projecting flange 29 on the side of a bracket 30 of the frame 13. This guide head 28 is held in place on the flange 29 by a plate 31 and is forced toward the guide face 26 by a spring 32 mounted on an adjusting rod 33 of the sliding head and bearing against an ear 34 of the bracket 30. The pivoted guide face 27 at its lower part stands slightly farther away from the opposite guide face 26 than at its upper part so that work may freely enter between them but will become tightly though slidably clamped between them as it moves upwardly between the cutters 16. The adjusting rod 33 has jam nuts 33' threaded thereon and bearing on the ear 34 to limit the inward movement of the presser head and prevent it from crushing the grooved edge of the work.

When the work is entered in the throat way between the guide faces 26 and 27 it rests on a slidably mounted work support 35 and engages a projection 36 on its rear end. By this engagement the work support 35 may be pushed rearwardly against the pressure of a spring 37 beneath its front end tending to hold it outwardly. As here shown the work support 35 comprises a slide with an inturned edge which passes beneath the edge of a strip 38 which is held to the frame 13 by screws and lies beneath the slide. A set screw 39 in the end of the slide 35 engages the strip 38 to limit the inward movement thereof and thus gage the depth of cut of the tongue or groove.

Pivotally mounted on the bracket 30 is a locking dog 40 which is adapted to drop into a slot or recess 41 of the slide 35 when the latter is in its rearmost position and thus automatically hold the slide against the pressure of spring 37 until the work in its upward movement between the guides engages a hooklike upper end 42 of the dog and lifts it out of the groove 41, whereupon the spring 37 returns the slide 35 to its former position. Should a strip of work be entered in the machine which is too thin to be properly clamped between the guides, the release of the work support by the lifting of the dog at the beginning of the upward movement of the work will permit said work support to spring forwardly and throw the work out from between the guides and thus prevent the work being carried between the cutters. This is an important operation, for the cutters turn in a direction to draw the work between them and a strip too thin to be properly restrained by the pressure of the guides would be liable to be drawn in so quickly as to wedge the cutters apart and disable the machine.

The guide 25 extends below the top of the frame section 13 and forms a dovetail guideway for a vertical moving slide 43 which is connected at its lower end by means of a pitman 44 with a crank arm 45 on a suitably driven shaft 46 journaled in the base frame. As here shown, the shaft 46 is given a variable speed movement by means of elliptical gears 47 connecting it with a shaft 48 which in turn is connected by intermeshing gears 49 with a shaft 50 carrying a gear wheel 51 meshing with a pinion 52 on a shaft 53 which is driven by a belt pulley 54 from any suitable source of power. The purpose of the elliptical gearing connection is to give the slide 43 a slow upward movement and a quick return downward movement.

Figure 2:
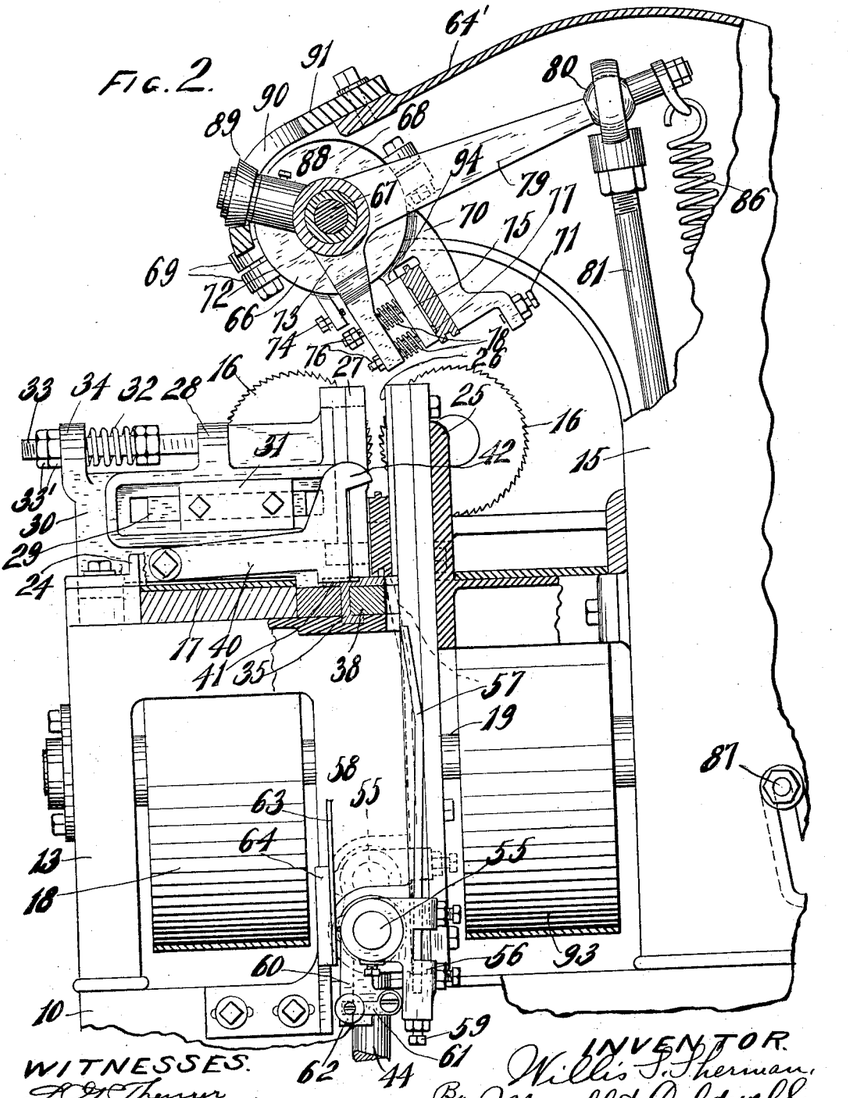
Fig. 2 is a similar enlarged view of a portion thereof showing the work pusher and the work carrier in different positions.
Figures 5, 6, 7, 8, 9, 10, 11, 12:
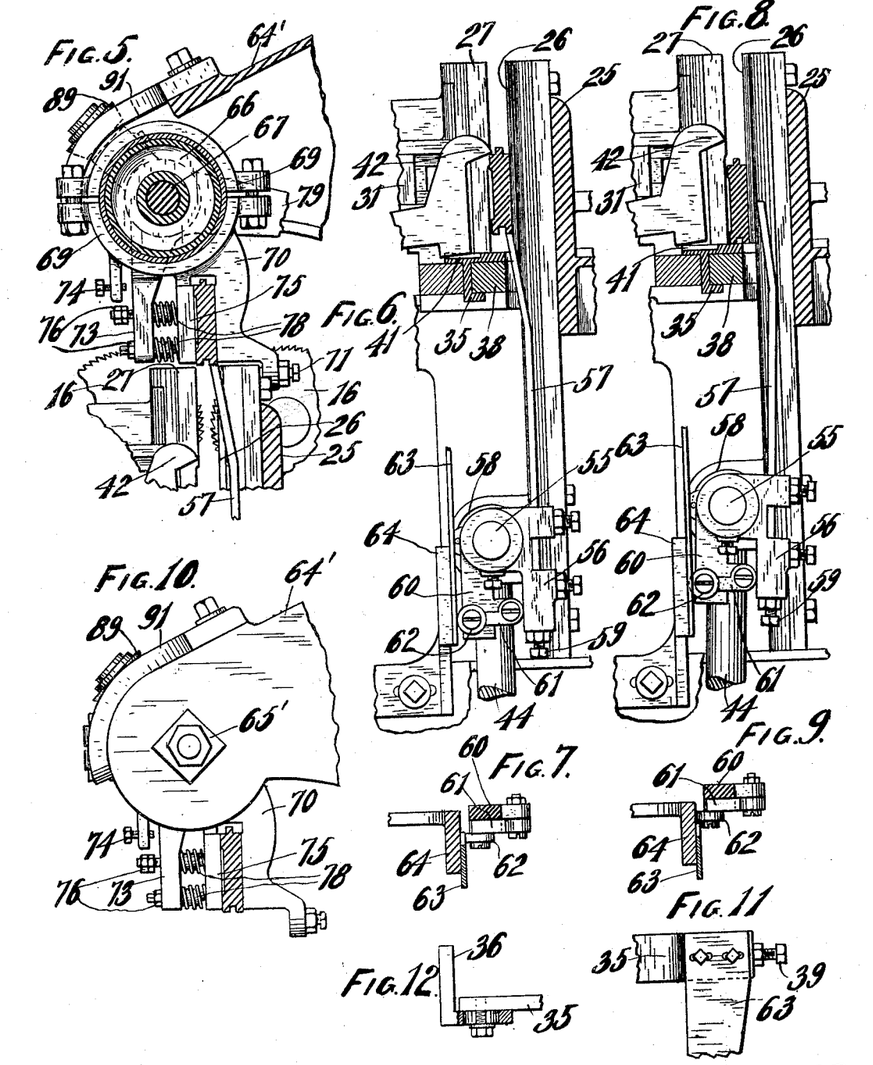

A rock shaft 55 passes through the pivotal connection between the pitman 44 and the slide 43 and has a pair of collars 56 fixed thereon, each of which constitutes a clamp for holding an upwardly extending finger 57 for engaging and pushing the work upwardly through the guides. The finger 57 which is nearer the cutters travels in a vertical groove of the guide 25 very close to the cutters and directly in the bearing face 26 and both of the fingers have notches formed for them in the edge of the work support 35 so that they may engage the lower edge of the strip of work. As the clamps 56 are movably mounted by the turning of the rock shaft 55, the fingers 56 will be capable of receding from the work so as to pass by it without engaging therewith, and this is the normal position for the fingers, the rock shaft 55 being under the influence of a spring 58 for this purpose. The fingers 57 are preferably bent near their upper ends, as shown in Fig. 2 to be out of the way and not clog the receiving throat way when a strip is moving upwardly. The rock shaft 55 has a crank arm 60 fixed thereon and pivotally mounted on it is an arm 61 carrying a roller 62, said arm 61 being permitted to freely swing upwardly but engaging a lug on the crank arm to prevent its swinging downwardly after it engages therewith, except by turning the rock shaft 55 to advance the fingers 57 beneath the edge of the work. An arm 63 adjustably mounted on the end of the work support 35, as shown in Fig. 12, has a portion of its lower end adapted to be brought into the path of travel of the roller 62 when the work support 35 is pressed rearwardly. This engagement on the downward movement of the slide 43 is of no consequence because of the roller arm 61 swinging away from its stop lug, but during the upward movement of the slide 43 the engagement of the roller 62 with the arm 63 causes the rock shaft 55 to slightly turn and bring the fingers 57 beneath the edge of the work to lift the work through the guides to the cutters and into a work carrier. In its upward movement the work engages the dog 40 to release the work support and permit it under the action of its spring 37 to return to its outer position ready for the next strip. A bracket 64 is mounted on the frame in position to have the arm 63 bear against it at that portion thereof which is engaged by the roller. Should an attempt be made to force the work rearwardly beneath the cutters when the fingers 57 would engage the side of the work instead of its lower edge, which would be undesirable, the roller 62 serves to prevent, for it would then have passed the lower end of arm 63 and the slide 35 could not be forced rearwardly since the arm 63 would engage the front flat face of the roller, as shown in Figs. 8 and 9. The work would therefore be automatically locked against movement to its operative position until the fingers 57 had traveled beyond the position where they might engage its side.

The frame section 15 has an extension reaching over the work support and in square openings in its sides are slidably mounted a pair of square bearing blocks 65 which are preferably formed integral with friction drums 66 so that the latter are prevented from turning. The friction drums 66 have a bolt 67 passing through them with a spacing sleeve 68 surrounding it and engaging the friction drums. Friction straps or bands 69 are clamped around the friction drums 66 so as to be turned thereon, but offering considerable resistance to such turning movement, and a jaw member 70 is secured to the friction straps and carries a set screw 71 to engage the guide 25 for limiting the movement of the jaw 70 in one direction so that it will stand in alinement with the guide face 26. A sleeve 72 loosely surrounds the sleeve 68 so as to turn thereon with its ends bearing against the friction drums 66 and a jaw member 73 is carried thereby which is adapted to engage set screws 74 on lugs projecting from the friction straps 69 of the other jaw member 70 so that when said jaw member 73 is swung to the left, as shown in Fig. 1, it causes the jaw member 70 to swing with it until the set screw 71 engages guide 25.

Pressure blocks 75 are mounted on the jaw member 73 near its ends by means of bolts 76, one of which is fixed in the pressure block and slides in the jaw member and the other of which is fixed in the jaw member and slides in the pressure block. The latter is provided with a rounded pointed head 77 to be forced into the work, as will be later described, and both of the bolts are surrounded by springs 78 for forcing the pressure blocks 75 away from the jaw member 73. The jaw member 73 is adapted to be moved away from the set screw 74 slightly to a position in which the pressure blocks bear the same relation to the jaw member 70 that the pivoted pressure head 27 bears to the stationary guide head face 26. In this position of the jaw member 73 the clamping block 75 stands in alinement with the guide face 27 so that the work will be forced between the clamping blocks 75 and the jaw member 70 when it leaves the guide faces 26 and 27 and be firmly clamped between them. The sleeve 72 has an arm 79 with a ball and socket joint 80 with the end of a connecting rod 81 which has another ball and socket joint 82 at its lower end with a spring arm 83 mounted on the frame and carrying a roller 84 to ride on a cam 85 on shaft 50. By this means movements are imparted to the sleeve 72 from the cam 85 and the parts are held under spring pressure by means of a coil spring 86 connecting the arm 79 with a stud 87 adjustably mounted in a slot of the frame. The sleeve 72 also has an arm 88 carrying a roller 89 riding in an oblique slot 90 in a curved plate 91 bolted to the frame 64 and when the sleeve is turned by the cam the roller 89 traveling through the oblique slot 90 forces the entire carrying mechanism, including both clamping jaws and the parts connected with them to slide in the frame on the square bearing blocks 65.

Figure 1:
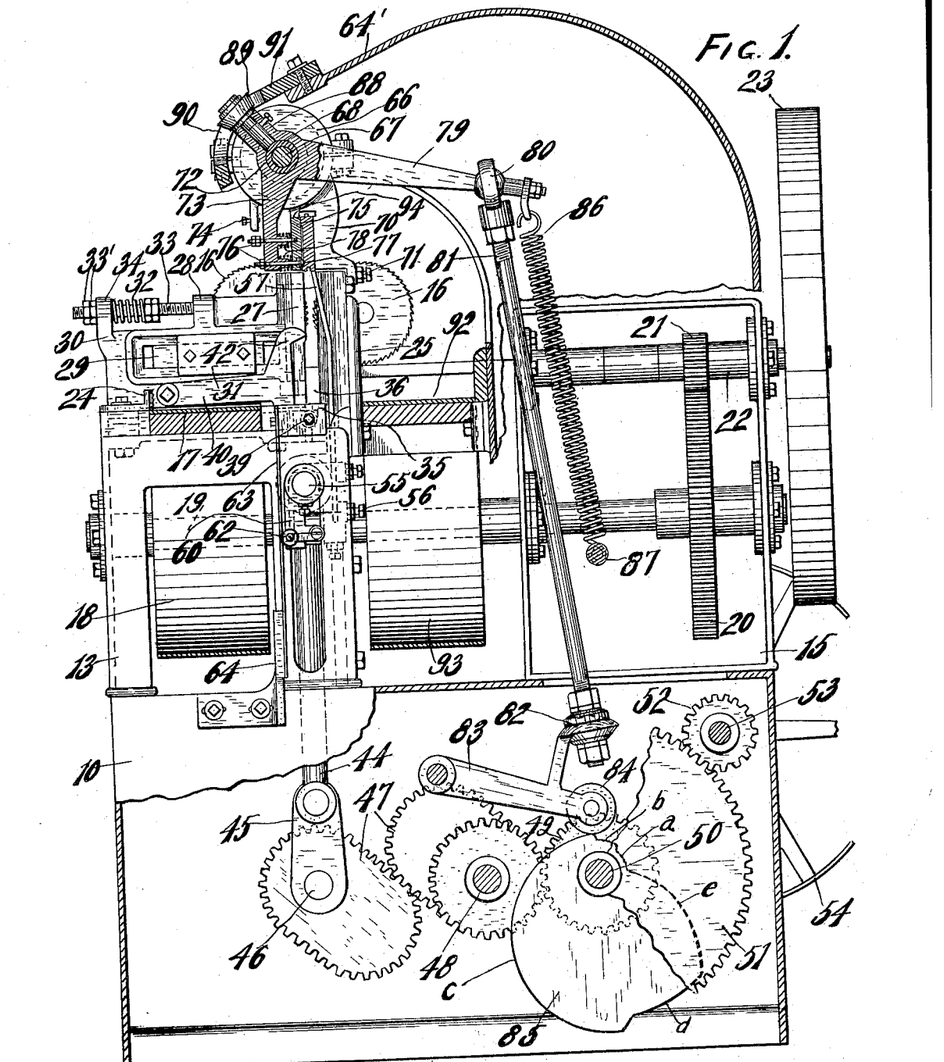
Figure 1 is a sectional front elevation of an end matcher constructed in accordance with this invention with parts broken away to show the construction thereof.

When the work is forced between the jaws of the carrier after clearing the cutters the roller 84 is on that portion of the cam 85 which is marked $b$ in Fig. 1, and immediately thereafter it rises on part $c$ to the position shown in Fig. 1, thus swinging the arm 79 upwardly and forcing the pointed head 77 into the work, the frictional resistance to the movement of the jaw member 70 offered by the friction drums causing said jaw member to resist the pressure incident to this movement until such engagement is made. Then the roller 84 gradually rises on part $c$ of the cam, causing a further upward movement of the arm 79 and a swinging movement of the jaw member 73 toward the jaw member 70 that forces the jaw member 70 to yield with the work clamped firmly between them. The parts continue in this direction until reaching the position shown in Fig. 2 where the roller drops into part $d$ of the cam and the work carrier releases the work by the jaw member 73 swinging away from jaw member 70 and withdrawing the pins 76 from the work and then withdrawing the pressure blocks 75.

The roller 84 then rides down the decline $e$ of the cam to bring jaw member 70 to its normal position and then rises onto part $b$ of the cam to restore the jaw member 73 to its normal position.

The sliding motion which is given to the work carrier by the roller 89 traveling in the oblique slot 90 serves to withdraw the work from the plane of the cutter so that when it is released it does not come in contact therewith. The work is dropped by the work carrier onto an outgoing conveyer belt 92 which passes around an idle pulley 93 loosely mounted on shaft 19 and carries the work away from the machine.

While the operation of the various parts has been described in connection with the description of their construction, it may be briefly summarized as follows: The work entering on conveyer belt 17 engages stop 24 from which it is taken by the operator and placed on edge in the throatway between the guides 26 and 27 and is pressed rearwardly against the projection 36 of the sliding work support 35, causing said work support to move rearwardly with it until the movement is arrested by the engagement of the set screw 39 with the end of strip 38. This movement of the work support brings the arm 63 into the path of roller 62 of the work lifting means and thereby causes said roller to swing the fingers 57 forwardly while they are on their upward movement so as to engage the lower edge of the work and force it upwardly between the clamping guides and into the action of the cutters.

The upward movement of the work by means of the work lifter continues until the work is delivered between the clamping jaws of the work carrier where it is firmly held. By the successive operations of the cam 85 on the roller 84 the work is swung over the conveyer belt 92 and dropped thereon to be carried from the machine, the work carrier returning to its normal position to receive the next strip. The work lifter also returns to its normal position immediately upon completing its upward movement and because of the elliptical form of its driving gears 47 this return movement is more quickly made than the upper movement to avoid waste of time. When the strip is pressed rearwardly so as to force the arm 63 in position for causing the fingers 57 to be thrown into their operative position the dog 40 drops into the slot 41 and locks the work support, the projection 36 in this locked position of the work support serving as a guide for determining the position of the work to receive the cutting operation to the desired depth. By the engagement of the arm 63 with the flat face of roller 62 at times when the fingers 57 would engage the side of the work if they were projected, such operation is prevented, the work support being momentarily locked against its inward movement until the ends of the fingers 57 have passed the work.

The work carrier for receiving and clamping the work and moving it to one side and dropping it is automatic in its operation and is timed with respect to the operation of the other mechanism so that as soon as the work is forced by the fingers 57 past the cutters and out of the guides 26 and 27 into the space between the clamping jaws 70 and 75 the pointed head 77 is forced into it so that it is tightly gripped while being carried over the guide 25 to the conveyer belt 92. The work is also tightly clamped between the guide faces 26 and 27 during its passage of the cutters, the spring 32 bearing upon the movable guide head 28 serving this purpose, and it is intended that the clamping effect by said guides and by the jaws of the carrier be sufficient to support the strip of flooring or the like, whatever its length, within the usual limits. And this is true whether the jaws of the work carrier are provided with the spurs 77 or not. The jaw member 75 of the work carrier engages at its upper edge a pair of lugs 94 projecting from the jaw member 70 to reinforce it and hold it in place while the work is being forced between the jaws.

By mounting the arm 63 so as to be adjustable on the work support, as shown in Fig. 11, the adjustment for the work support to vary the depth of cut may be made without interfering with the coöperation between said arm and the roller 62, the adjustments of the arm being made to compensate for the adjustments of the work support. The position of the dog 40 may be correspondingly adjusted so as to engage the notch or recess 41 in the adjusted position of the work support. By adjustably mounting the work stop 36 on the work support, as shown in Fig. 12, the depth of cut may be varied without having to adjust the dog 40.

By reason of the presser guide head 27 being pivotally mounted it is permitted to fit snugly against the smooth unrecessed face of the work without marring it, even though the work may slightly vary in thickness at the end or bend and the tapering throat way allows sufficient space on either side thereof to accommodate work which is slightly bent in either direction.

By locating one of the fingers of the lifting mechanism directly in the guide face 26 of the presser guides the pressure is exerted upon work in such a manner as to avoid any tendency to tilt it out of its proper position with relation to the cutters.

While it is probably most desirable to force the work upwardly against the cutters, it is obvious that the movements may be made in any direction without departing from the invention and consequently such terms as "work lifter" as herein employed are intended to include devices having such other directions of movement.

It is not necessary that the means engaged by the work for moving the work feeding means, the fingers, into their engaging position form a part of the work support itself, as it is obvious that a stationary work support will serve the purpose when other means are provided for connecting the work engaged part with the mechanism for moving the work feeding means.

By means of this invention the operation of end matching may be greatly facilitated, the machine being continuous in its movements and automatically thrown into engagement with the work by the act of placing the work in operative position therein, and as soon as the work is in this position the operator may leave it entirely to the care of the machine and give his attention to placing the succeeding strip in position.

What I claim as new and desire to secure by Letters Patent is:

1. An end matcher, comprising a work support, a reciprocating work lifter having a laterally movable finger for engaging the work and lifting it from the work support, means for moving said finger, guides through which the work travels when carried by the work lifter, and a cutter in the path of the work as it travels through the guides.

2. An end matcher, comprising work guides between which the work may pass, work feeding means capable of movement into or out of position for forcing the work through the guides, means engaged by the work when the work is in position to pass through the guides for moving said work feeding means into position for engaging the work, and a cutter in the path of the work in its travel through the guides.

3. An end matcher, comprising guides, a movable work support, a work feeding means having a part capable of being moved into or out of position for engagement with the work to feed it from the work support through the guides, means dependent upon the movements of the work support for effecting the movements of such engaging part of the work feeding means, and a cutter in the path of the work in its travel through the guides.

4. An end matcher, comprising guides, a movable work support, a reciprocating work feeding means having a finger capable of being moved into or out of position for engagement with the work to feed it from the work support through the guides, means dependent upon the movement of the work support for causing the movements of the finger, and a cutter in the path of the work in its travel through the guides.

5. An end matcher, comprising a slidable work support, a projection thereon to be engaged by the work for sliding the work support, a work feeding means having fingers capable of moving into and out of position for engaging the work to move it from the work support, means controlled by the position of the work support for effecting the movement of the fingers of the work feeding means, guides between which the work travels when carried by the work feeding means, and a cutter in the path of the work in its travel between the guides.

6. An end matcher, comprising a movable work support, a projection thereon engaged by the work for moving the work support, a stop for limiting the movement of the work support and determining the operative position for the work, a work feeder having movable fingers adapted to be moved into or out of position for engaging the work and moving it off of the work support, means controlled by the position of the work support for moving said fingers, guides between which the work travels when carried by the work feeder, and a cutter in the path of the work while passing between the guides.

7. An end matcher, comprising guides between which the work may travel, means engaged and moved by the work in assuming a position to travel through the guides and forming a stop for limiting movement of the work in determining the operative position therefor, a lock for holding said means in the position to which it is moved by the work, a work feeder having a work engaging part capable of being moved by said means into or out of position to engage the work and adapted to force the work through the guides, said lock being released by the movement of the work through the guides, and a cutter in the path of the work through the guides.

8. An end matcher, comprising a slidable spring retracted work support, a projection thereon to be engaged by the work for moving the work support, a stop for limiting the movements of the work support and determining the operative position for the work, means for locking the work support in such position, a work feeder having movable fingers capable of being moved into or out of position to engage the work on the work support and adapted to move the work from the work support, said locking means for the work support being released by the upward movement of the work, means depending upon the position of the work support for moving the fingers, guides between which the work is carried by the work feeder, and a cutter in the path of the work during its travel between the guides.

9. An end matcher, comprising a sliding spring retracted work support, a projection thereon to be engaged by the work for sliding the work support, a stop for limiting the movements of the work support and determining the operative position for the work, a dog adapted to engage and lock the work support in this position and extending above the work, a work lifter having movable fingers capable of being moved into and out of position to engage the work on the work support and lift it into engagement with the dog for releasing the dog from its locking engagement with the work support, guides between which the work is moved by the work lifter, and a cutter in the path of the work during its travel between the guides.

10. An end matcher, comprising a stationary work support, a slidably mounted work feeder frame, a shaft journaled therein, means for reciprocating the frame, fingers carried by the shaft, an arm on the shaft, a roller carried by the arm, and means in the path of the roller for swinging the arm and the shaft and thereby causing the fingers to move into a position for engaging the work on the work support, guides between which the work is carried by the fingers, and a cutter in the path of the work, in its travel between the guides.

11. An end matcher, comprising a movable work stop, a work feeder frame mounted to slide vertically, means for reciprocating the work feeder frame, a shaft journaled on the work feeder frame, upstanding fingers carried by the shaft, a crank arm on the shaft, an arm pivotally mounted on the crank arm, a lug on the crank arm against which the arm rests, a roller on the arm, a member carried by the work stop, and adapted in the movements of the work stop to be brought into the path of the roller for causing the crank arm to swing and turn the shaft to move the fingers to a position for engaging the work, guides between which the work is carried by the fingers, and a cutter in the path of travel of the work between the guides.

12. An end matcher, comprising a work feeder for moving the work, guides between which the work travels, a cutter in the path of the work in its travel between the guides, and a work carrier, comprising a frictionally held pivotally mounted jaw member, a swinging jaw member coöperating therewith for clamping the work between them, and means for moving the swinging jaw member toward the other jaw member to cause said frictionally held jaw member to yield and carry the work away from the guides before releasing it.

13. An end matcher, comprising a work feeder, guides between which the work travels, a cutter in the path of the work in its travel between the guides, a frictionally held yielding jaw member, a swinging jaw member coöperating therewith to receive and clamp the work between them when it travels from between the guides, means for swinging the swinging jaw member for causing said frictionally held jaw member to yield so that the work is carried away from the guides, and a stop on the frictionally held jaw member engaged by the swinging jaw member for returning the frictionally held jaw member.

14. An end matcher, comprising a work feeder, guides between which the work travels a cutter in the path of the work in its travel between the guides, a work carrier having jaw members to receive the work as it leaves the work guides, and means for moving the work carrier to one side of the work guides and in a direction to back the work away from the cutter.

15. An end matcher, comprising a frame, a work support thereon, a work feeder for moving the work from the work support, guides between which the work travels, a cutter in the path of the work in its travel between the guides, bearing blocks slidably mounted in the frame without turning, friction drums carried by the bearing blocks, a bolt connecting the bearing blocks, a sleeve pivotally mounted on the bolt between the drums, a roller carried by the sleeve, there being an oblique slot in the frame through which the roller travels for sliding the bearing blocks, friction straps surrounding the friction drums, a yielding jaw member carried by the friction straps, a swinging jaw member carried by the sleeve, and means for turning the sleeve to swing the swinging jaw member and clamp the work between it and the yielding jaw member and carry the work away from the guides and the cutter.

16. An end matcher, comprising a frame, a work support thereon, means for moving the work from the work support, guides between which the work travels, a cutter in the path of the work in its travel, angular bearing blocks slidably mounted in the frame, a bolt connecting the bearing blocks, friction drums on the bearing blocks, a sleeve loosely mounted on the bolt, a roller carried thereby, there being an oblique slot in the casing through which the roller rides for sliding the bearing blocks in the frame, a swinging jaw member carried by the sleeve, an arm also carried by the sleeve, means for swinging the arm, bolts on the swinging jaw, pressure blocks slidably mounted on the swinging jaws by means of said bolts, and springs interposed between the pressure blocks and the swinging jaw, one of the bolts being fixed in the swinging jaw and having a pointed end to be forced into the work during the swinging movement of the swinging jaw, said swinging movement of the swinging jaw serving to clamp the work between the jaws and carry it away from the guides.

17. An end matcher, comprising a work support, means for moving the work from the work support, a stationary guide having a pair of spaced bearing faces, and a coöperating spring-pressed pressure guide also having a pair of spaced bearing faces and being pivotally mounted to accommodate itself to work of varying thickness, and a cutter in the path of the work between the guides.

18. An end matcher, comprising a reciprocating work lifter having a finger thereon movable into or out of engaging position for engaging the work and lifting it, means for moving said finger, guides through which the work travels when carried by the work lifter, and a cutter in the path of the work as it travels through the guides.

In testimony whereof, I affix my signature, in presence of two witnesses.

WILLIS S. SHERMAN.

Witnesses:
  GOLDIE LEVINE,
  ANTHONY DONTIE.

Copies of this patent may be obtained for five cents each, by addressing the "Commissioner of Patents, Washington, D. C."